(12) United States Patent
Walker et al.

(10) Patent No.: US 10,174,635 B2
(45) Date of Patent: Jan. 8, 2019

(54) ROLLING ELEMENT BEARING CONFIGURED WITH A GUTTER AND ONE OR MORE FLUID PASSAGES

(71) Applicant: United Technologies Corporation, Hartford, CT (US)

(72) Inventors: Brady Walker, Rocky Hill, CT (US); Ronnie K. Kovacik, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 674 days.

(21) Appl. No.: 14/769,049

(22) PCT Filed: Feb. 20, 2014

(86) PCT No.: PCT/US2014/017373
§ 371 (c)(1),
(2) Date: Aug. 19, 2015

(87) PCT Pub. No.: WO2014/130662
PCT Pub. Date: Aug. 28, 2014

(65) Prior Publication Data
US 2016/0003100 A1    Jan. 7, 2016

Related U.S. Application Data

(60) Provisional application No. 61/767,068, filed on Feb. 20, 2013.

(51) Int. Cl.
*F01D 25/18* (2006.01)
*F01D 25/16* (2006.01)
(Continued)

(52) U.S. Cl.
CPC .......... *F01D 25/183* (2013.01); *F01D 25/16* (2013.01); *F01D 25/18* (2013.01); *F02C 7/06* (2013.01);
(Continued)

(58) Field of Classification Search
CPC .... F16D 25/183; F16D 25/16; F16D 2220/30; F16D 2240/54; F16D 25/18; F16C 33/6651; F16C 33/6677; F16C 19/06; F16C 7/06; F16C 33/60; F16C 33/6674; F16C 33/6681; F16C 33/586
(Continued)

(56) References Cited

U.S. PATENT DOCUMENTS 4,334,720 A    6/1982  Signer
4,463,994 A    8/1984  Eliason et al.
(Continued)

OTHER PUBLICATIONS

EP search report for EP14754461.3 dated May 18, 2016.

*Primary Examiner* — Mark Laurenzi
*Assistant Examiner* — Mickey France
(74) *Attorney, Agent, or Firm* — O'Shea Getz P.C.

(57) ABSTRACT

A rolling element bearing includes a plurality of rolling elements that are arranged circumferentially around an axis, and radially between a bearing inner ring and a bearing outer ring. The inner ring extends axially between a first end and a second end, and includes a plurality of passages that are fluidly coupled with a channel. The passages are arranged circumferentially around the axis. The channel extends axially into the inner ring from the second end, and includes a gutter that extends radially into and axially within the inner ring.

20 Claims, 6 Drawing Sheets

(51) Int. Cl.
  *F16C 19/06* (2006.01)
  *F16C 33/66* (2006.01)
  *F02C 7/06* (2006.01)
  *F16C 33/60* (2006.01)
  *F16C 33/58* (2006.01)

(52) U.S. Cl.
  CPC ............ *F16C 33/586* (2013.01); *F16C 33/60* (2013.01); *F16C 33/6651* (2013.01); *F16C 33/6674* (2013.01); *F16C 33/6677* (2013.01); *F16C 33/6681* (2013.01); *F05D 2220/30* (2013.01); *F05D 2240/54* (2013.01); *F16C 19/06* (2013.01); *F16C 2360/23* (2013.01)

(58) Field of Classification Search
  USPC ........................................................ 415/116
  See application file for complete search history.

(56) References Cited

U.S. PATENT DOCUMENTS

| | | |
|---|---|---|
| 5,106,209 A | 4/1992 | Atkinson et al. |
| 2001/0012415 A1 | 8/2001 | Kasuga et al. |
| 2003/0086632 A1 | 5/2003 | Richard et al. |
| 2003/0118256 A1 | 6/2003 | Ishihara |
| 2006/0062504 A1 | 3/2006 | Wilton et al. |
| 2006/0107647 A1 | 5/2006 | Labala |
| 2009/0317029 A1 | 12/2009 | Dobek et al. |
| 2013/0004109 A1 | 1/2013 | Metzger et al. |

ROLLING ELEMENT BEARING CONFIGURED WITH A GUTTER AND ONE OR MORE FLUID PASSAGES

This application claims priority to PCT Patent Appln. No. PCT/US14/17373 filed Feb. 20, 2014, which claims priority to U.S. Patent Appln. No. 61/767,068 filed Feb. 20, 2013.

BACKGROUND OF THE INVENTION

1. Technical Field

This disclosure relates generally to a rolling element bearing and, more particularly, to a rolling element bearing configured with one or more fluid passages.

2. Background Information

A typical rolling element bearing for a turbine engine includes a plurality of rolling elements that are radially engaged between a bearing inner ring and a bearing outer ring. The inner ring may include a plurality of fluid passages that direct lubrication oil to a seal plate mounted axially adjacent the inner ring. The seal plate may include an annular notch that fluidly couples the fluid passages in the inner ring to a plurality of fluid passages in the seal plate. However, where the number of fluid passages in the seal plate is greater than the number of fluid passages in the inner ring, some of the fluid passages in the seal plate may receive more of the lubrication oil than others. A larger portion of the lubrication oil, for example, will generally flow into those fluid passages in the seal plate that are located circumferentially closest to the fluid passages in the inner ring. Such a non-uniform distribution of the lubrication oil through the seal plate may cause a non-uniform temperature differential in the seal plate, which may increase thermally induced stresses and distortions within the seal plate.

There is a need in the art for an improved rolling element bearing.

SUMMARY OF THE DISCLOSURE

According to an aspect of the invention, a rolling element bearing is provided that includes a plurality of rolling elements, a bearing inner ring and a bearing outer ring. The rolling elements are arranged circumferentially around an axis, and radially between the inner ring and the outer ring. The inner ring extends axially between a first end and a second end, and includes a plurality of passages that are fluidly coupled with a channel. The passages are arranged circumferentially around the axis. The channel extends axially into the inner ring from the second end, and includes a gutter that extends radially into and axially within the inner ring.

According to another aspect of the invention, another rolling element bearing is provided that includes a plurality of rolling elements, a bearing inner ring and a bearing outer ring. The rolling elements are arranged circumferentially around an axis, and radially between the inner ring and the outer ring. The inner ring extends axially between a first end and a second end, and includes a plurality of first passages, a plurality of second passages and a channel. The first passages are adapted to direct lubricant from respective first passage inlets to the channel. The second passages are adapted to direct lubricant from respective second passage inlets to the rolling elements, where one of the second passage inlets is substantially axially aligned with one of the first passage inlets. The channel extends axially into the inner ring from the second end, and includes a gutter that extends radially into and axially within the inner ring.

According to still another aspect of the invention, an assembly for a turbine engine is provided that includes a rolling element bearing and a turbine engine component, which are arranged along an axis. The bearing includes a bearing inner ring that extends axially between a first end and a second end. The inner ring includes a plurality of first passages that are fluidly coupled with a channel. The first passages are arranged circumferentially around the axis. The channel extends axially into the inner ring from the second end, and includes a gutter that extends radially into and axially within the inner ring. The turbine engine component includes a plurality of component passages. The channel is fluidly coupled between the first passages and the component passages.

The inner ring may include a second channel that is adapted to direct lubricant into the first passage inlets and the second passage inlets. The second channel may extend axially into the inner ring from the first end.

The channel (e.g., first channel) may extend circumferentially substantially or partially around the axis.

The channel (e.g., first channel) may include an annular notch that extends axially into the inner ring from the second end. The gutter may be configured as or otherwise include an annular groove that extends radially into the inner ring from the notch.

Each of the passages (e.g., first passages) may include a passage inlet that is located at the first end. Each of the passages (e.g., first passages) may extend axially through the inner ring from the passage inlet to the channel (e.g., first channel).

The channel may be configured as or otherwise include a first channel. The inner ring may also include a second channel that extends axially into the inner ring from the first end. The passages (e.g., first passages) may extend axially through the inner ring between the second channel and the first channel.

The second channel may be configured as or otherwise include an annular notch and/or groove.

One of the passages (e.g., first passages) may include a slot that extends radially into the inner ring from an inner side of the inner ring.

The passages may be configured as or otherwise include a plurality of first passages. The inner ring may also include a plurality of second passages that are arranged circumferentially around the axis. The second passages may extend radially through the inner ring to respective second passage outlets.

One of the second passages may include an aperture that extends radially through the inner ring to a respective one of the second passage outlets.

One of the second passages may include a slot that is fluidly coupled with an aperture. The slot may extend radially into the inner ring from an inner side of the inner ring. The aperture may extend radially through the inner ring to the respective second passage outlet.

The channel may be configured as or otherwise include a first channel. The inner ring may also include a second channel. The slot may extend axially through the inner ring to the second channel. The aperture may extend radially through the inner ring between the second channel and a respective one of the second passage outlets. One of the first passages may include a second slot and a third slot. The second slot may extend axially through the inner ring to the second channel. The third slot may extend axially through the inner ring between the second channel and the first channel.

The second channel may be configured as or otherwise include an annular channel.

The inner ring may be configured as or otherwise include a split ring.

The component passages may be arranged circumferentially around the axis. Each of the component passages may extend radially through the turbine engine component to a component passage outlet.

The turbine engine component may include an annular notch that fluidly couples the channel to the component passages.

The turbine engine component may be configured as or otherwise include a seal plate.

The foregoing features and the operation of the invention will become more apparent in light of the following description and the accompanying drawings.

DETAILED DESCRIPTION OF THE INVENTION

Figure 1:
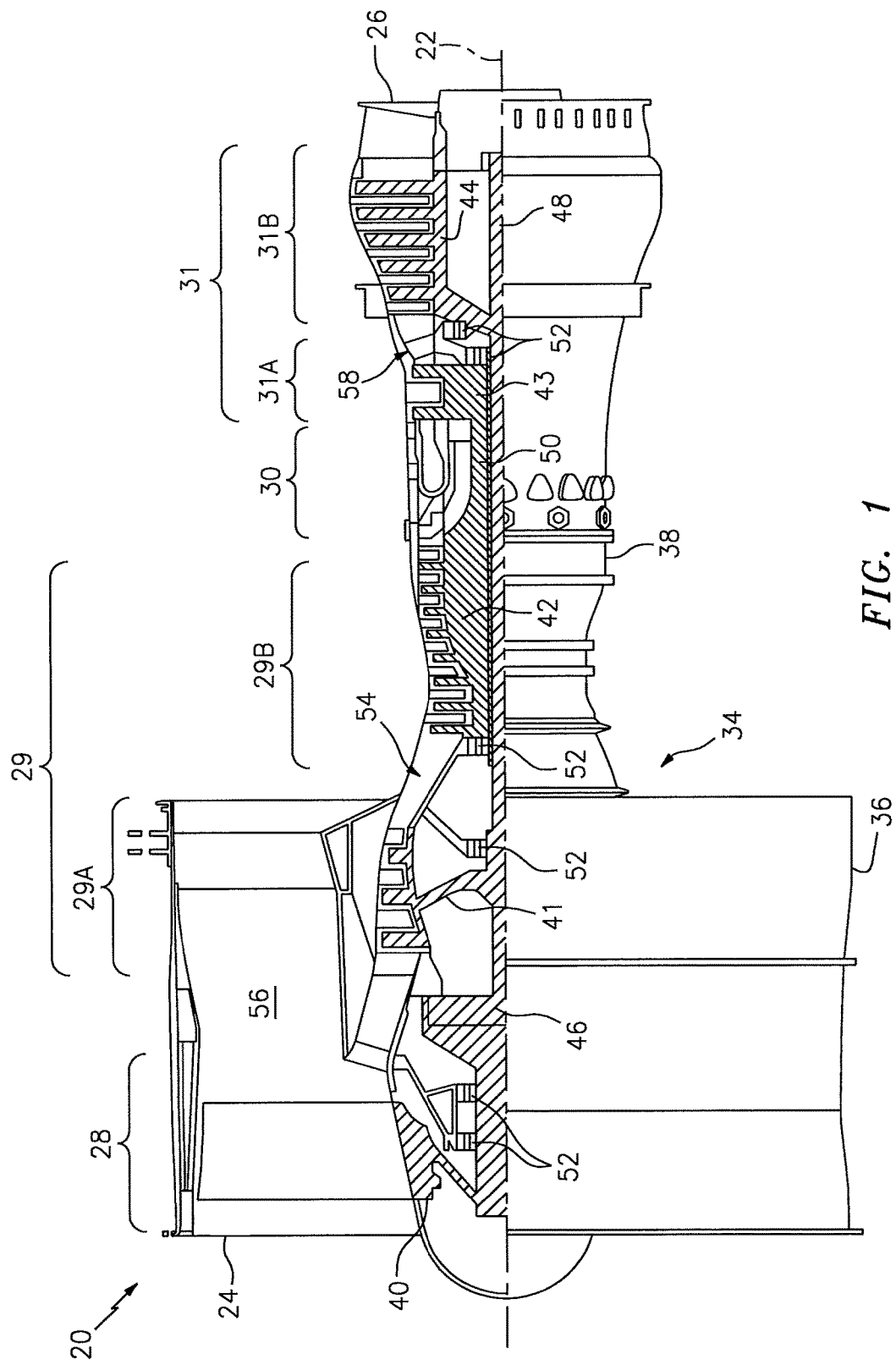
FIG. 1 is a side cutaway illustration of a geared turbine engine.

FIG. 1 is a side cutaway illustration of a geared turbine engine 20 that extends along an axis 22 between an upstream airflow inlet 24 and a downstream airflow exhaust 26. The engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B. The engine sections 28-31 are arranged sequentially along the axis 22 within an engine housing 34, which includes a first engine case 36 (e.g., a fan nacelle) and a second engine case 38 (e.g., a core nacelle).

Each of the engine sections 28, 29A, 29B, 31A and 31B includes a respective rotor 40-44. Each of the rotors 40-44 includes a plurality of rotor blades arranged circumferentially around and connected to (e.g., formed integral with or attached to) one or more respective rotor disks. The fan rotor 40 is connected to a gear train 46; e.g., an epicyclic gear train. The gear train 46 and the LPC rotor 41 are connected to and driven by the LPT rotor 44 through a low speed shaft 48. The HPC rotor 42 is connected to and driven by the HPT rotor 43 through a high speed shaft 50. The low and high speed shafts 48 and 50 are rotatably supported by a plurality of bearings 52. Each of the bearings 52 is connected to the second engine case 38 by at least one stator such as, for example, an annular support strut.

Air enters the engine 20 through the airflow inlet 24, and is directed through the fan section 28 and into an annular core gas path 54 and an annular bypass gas path 56. The air within the core gas path 54 may be referred to as "core air". The air within the bypass gas path 56 may be referred to as "bypass air". The core air is directed through the engine sections 29-31 and exits the engine 20 through the airflow exhaust 26. Within the combustor section 30, fuel is injected into and mixed with the core air and ignited to provide forward engine thrust. The bypass air is directed through the bypass gas path 56 and out of the engine 20 to provide additional forward engine thrust, or reverse thrust via a thrust reverser.

Figure 2:
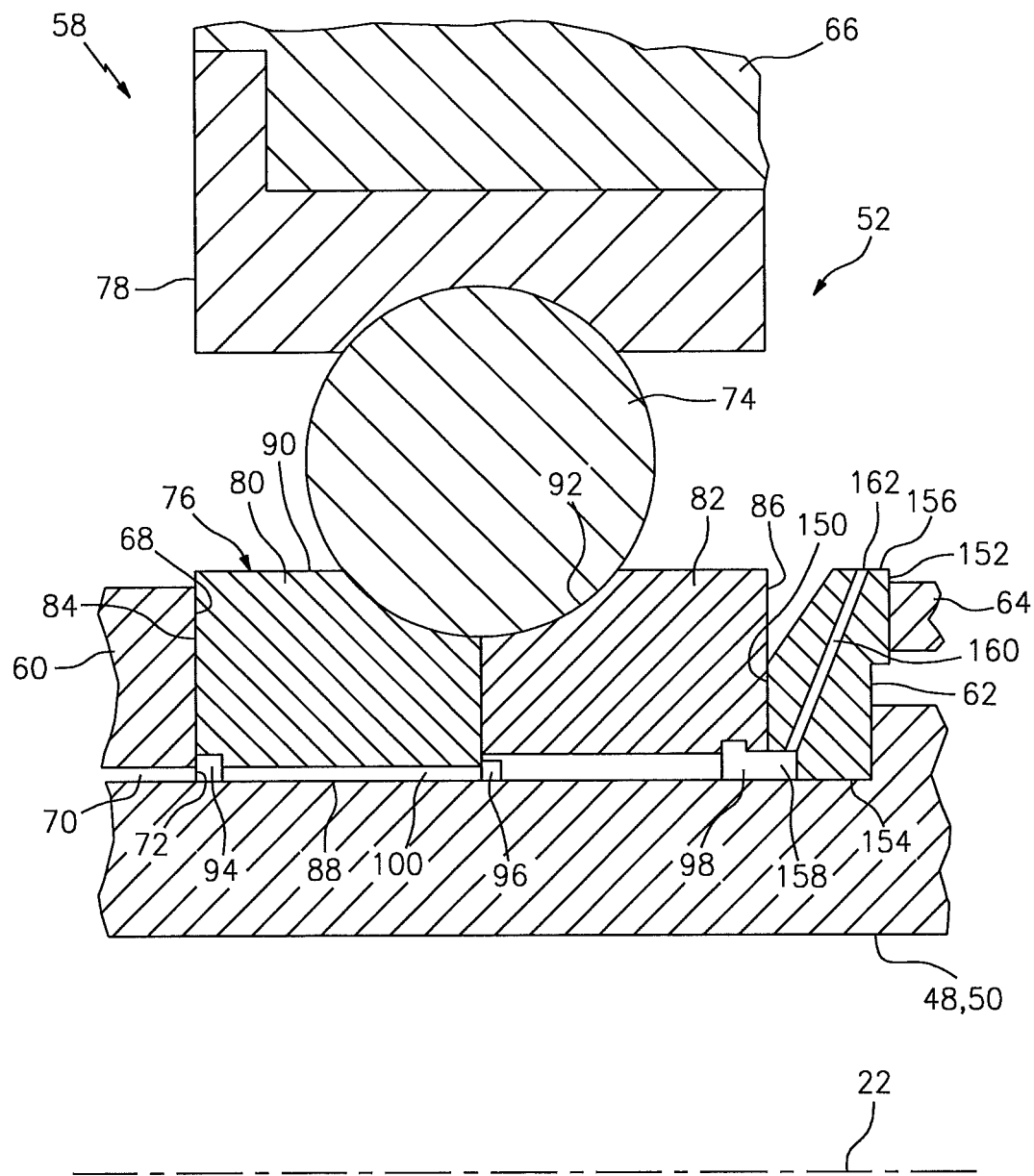
FIG. 2 is a side sectional illustration of a portion of an assembly for the engine of FIG. 1.

FIG. 2 is a side sectional illustration of a portion of an assembly 58 for the engine 20 of FIG. 1. The assembly 58 includes one of the shafts 48 and 50, a spacer 60, one of the bearings 52, a seal plate 62, and a face seal 64 (e.g., an annular carbon face seal). The assembly 58 also includes a stator 66 such as, for example, the strut that structurally connects the bearing 52 to the second engine case 38 (see FIG. 1).

The spacer 60 extends axially to a spacer end 68. The spacer 60 includes one or more spacer passages 70, which are arranged circumferentially around the axis 22. One or more of the spacer passages 70 each extends axially through the spacer 60 to a spacer passage outlet 72, which is located at (e.g., on, adjacent or proximate) the spacer end 68.

The bearing 52 of FIG. 2 is configured as a rolling element bearing such as, for example, a ball bearing. Alternatively, the bearing 52 may be configured as a cylindrical rolling bearing, a tapered rolling bearing, a spherical rolling bearing, a needle rolling bearing, or any other type of rolling element bearing. The bearing 52 includes a plurality of rolling elements 74, a bearing inner ring 76 and a bearing outer ring 78. The rolling elements 74 are arranged circumferentially around the axis 22, and radially between the inner ring 76 and the outer ring 78.

The inner ring 76 is configured as a split ring that includes, for example, a pair of axial ring segments 80 and 82. Alternatively, the inner ring 76 may be configured as a unitary body. The inner ring 76 extends circumferentially around the axis 22. The inner ring 76 extends axially between a ring first end 84 and a ring second end 86. The inner ring 76 extends radially between a ring inner side 88 and a ring outer side 90, which includes a raceway surface 92 that engages (e.g., contacts) the rolling elements 74. The inner side 88 defines a bore of the inner ring 76.

Figure 3:
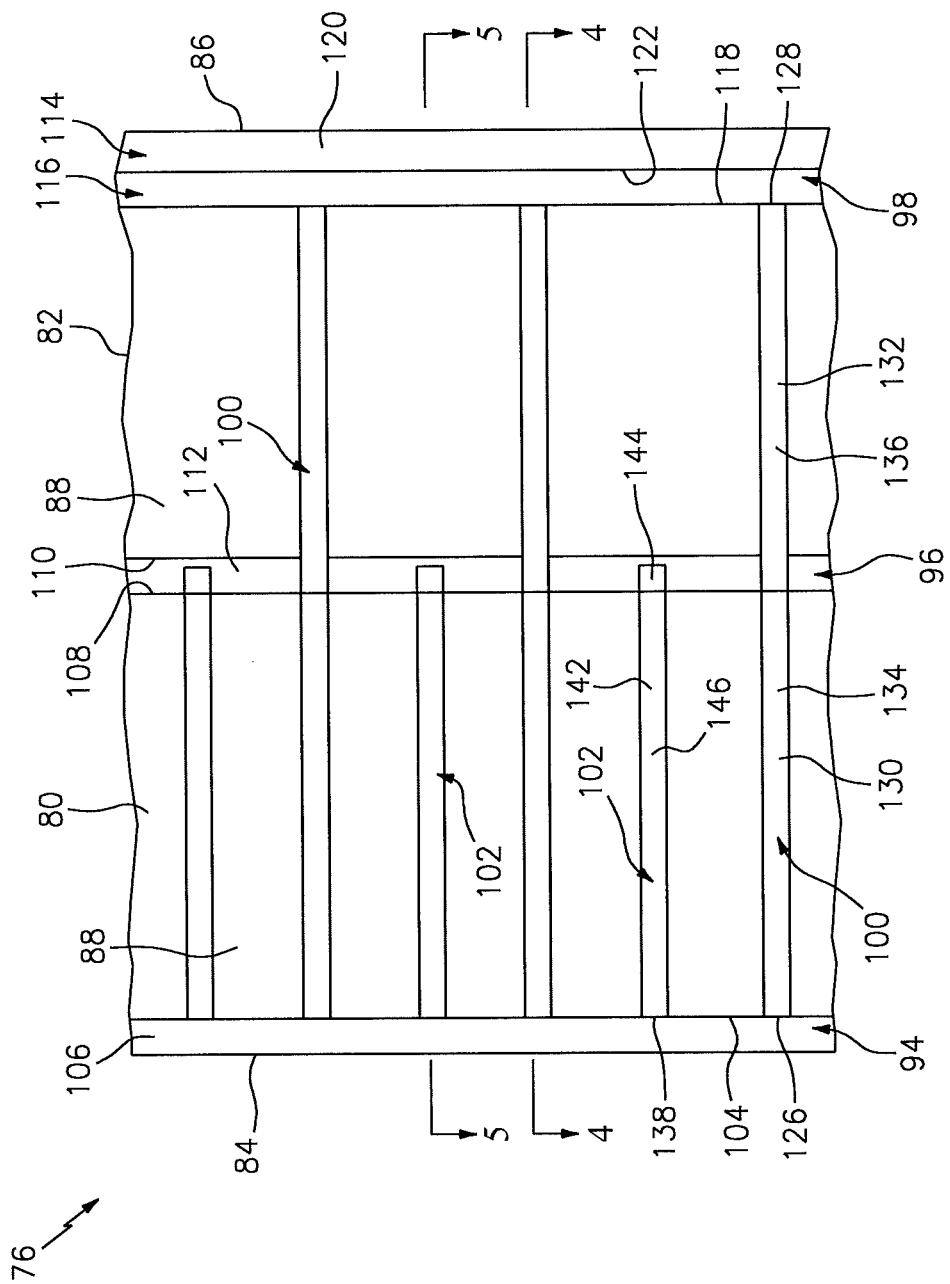
FIG. 3 is an illustration of a portion of an inner side of a bearing inner ring for the assembly of FIG. 2.
Figure 4:
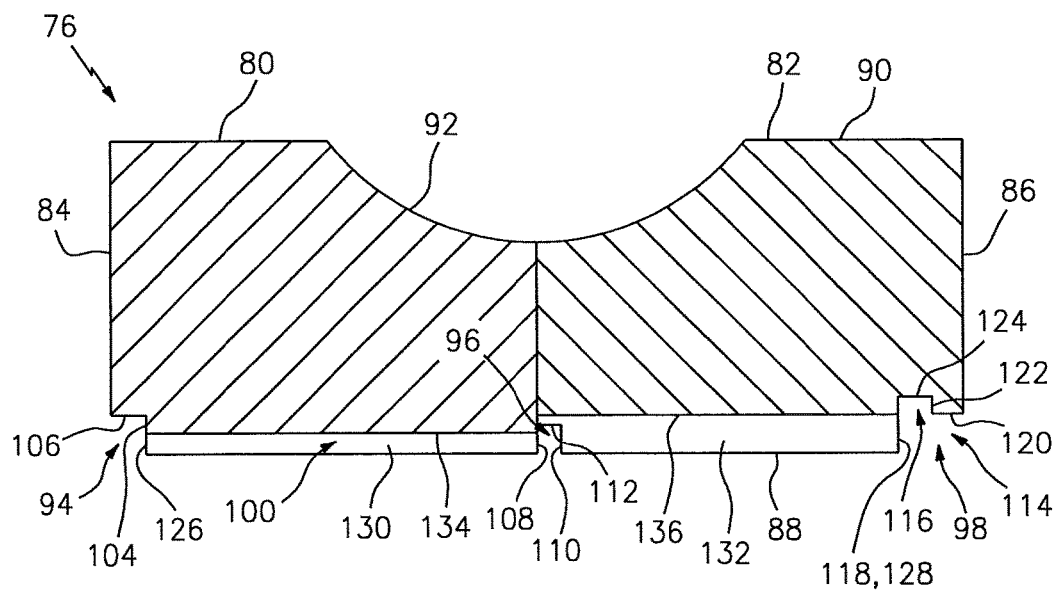
FIG. 4 is a side-sectional illustration of the inner ring of FIG. 3 at a first circumferential position.
Figure 5:
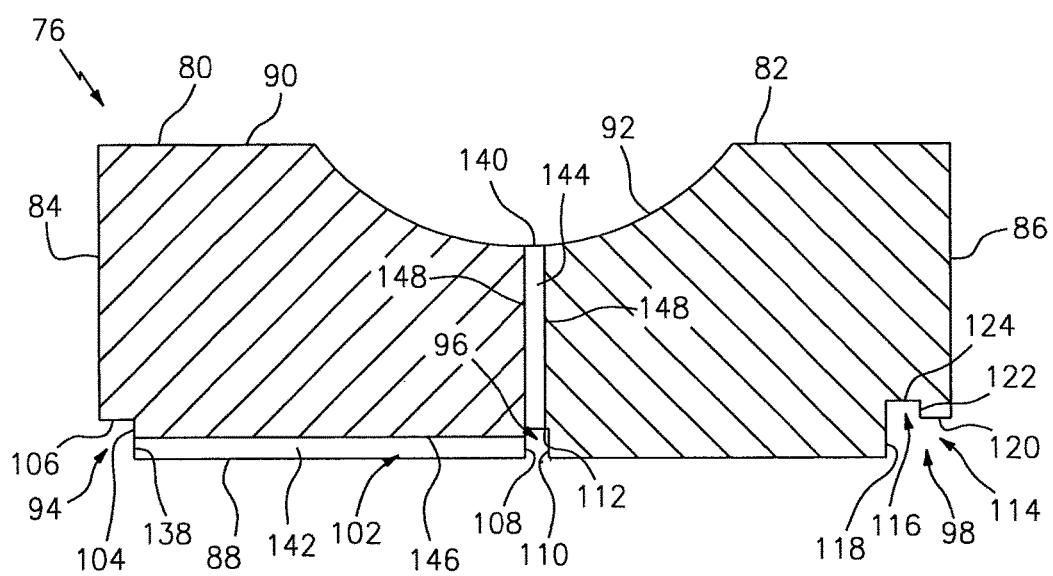
FIG. 5 is a side-sectional illustration of the inner ring of FIG. 3 at a second circumferential position.

Referring to FIGS. 3 to 5, the inner ring 76 includes one or more fluid collection and/or distribution channels such as, for example, an inlet channel 94, an intermediate channel 96 and an outlet channel 98. The inner ring 76 also includes one or more fluid passages such as, for example, one or more axial passages 100 and one or more radial passages 102.

The inlet channel 94 may be configured as an annular notch. The inlet channel 94 extends axially into the inner ring 76 from the ring first end 84 to an inlet channel end 104. The inlet channel 94 extends radially into the inner ring 76 from the ring inner side 88 to an inlet channel side 106. The inlet channel 94 extends circumferentially around the axis 22 through the inner ring 76.

The intermediate channel 96 may be configured as an annular groove that is defined between the ring segments 80 and 82. The intermediate channel 96 extends axially within the inner ring 76 between an intermediate channel first end 108 and an intermediate channel second end 110. The intermediate channel 96 extends radially into the inner ring 76 from the ring inner side 88 to an intermediate channel side 112. The intermediate channel 96 extends circumferentially around the axis 22 through the inner ring 76.

The outlet channel 98 includes a flow passage 114 and a gutter 116 (e.g., a lubrication oil gallery). The flow passage 114 may be configured as an annular notch, and the gutter 116 may be configured as an annular groove. The flow passage 114 extends axially into the inner ring 76 from the ring second end 86 to an outlet channel end 118. The flow passage 114 extends radially into the inner ring 76 from the ring inner side 88 to a flow passage side 120, which defines a radial flow passage height at the ring second end 86. The flow passage 114 extends circumferentially around the axis 22 through the inner ring 76. The gutter 116 extends axially within the inner ring 76 between a gutter end 122 and the outlet channel end 118. The gutter 116 extends radially into the inner ring 76 from the flow passage 114 to a gutter side 124. The gutter 116 extends circumferentially around the axis 22 through the inner ring 76.

Referring to FIGS. 3 and 4, the axial passages 100 are arranged circumferentially around the axis 22. One or more of the axial passages 100 each extends axially through the inner ring 76 between an axial passage inlet 126 and an axial passage outlet 128. The axial passage inlet 126 is located at the inlet channel end 104, and is fluidly coupled with the inlet channel 94. The axial passage outlet 128 is located at the outlet channel end 118, and is fluidly coupled with the outlet channel 98.

One or more of the axial passages 100 each includes one or more slots 130 and 132. The first slot 130 extends axially through the inner ring 76 from the axial passage inlet 126 and the inlet channel 94 to the intermediate channel 96. The first slot 130 extends radially into the inner ring 76 from the ring inner side 88 to a first slot side 134, which defines a radial first slot height at the intermediate channel first end 108. This first slot height may be less than (or alternatively substantially equal to) the flow passage height. The second slot 132 extends axially through the inner ring 76 from the intermediate channel 96 to the outlet channel 98 and the axial channel outlet 128. The second slot 132 extends radially into the inner ring 76 from the ring inner side 88 to a second slot side 136, which defines a radial second slot height at the outlet channel end 118. This second slot height may be greater than (or substantially equal to) the first slot height, and less than (or substantially equal to) the flow passage height.

Referring to FIGS. 3 and 5, the radial passages 102 are arranged circumferentially around the axis 22. Each of the radial passages 102, for example, is arranged between a respective adjacent pair of the axial passages 100. One or more of the radial passages 102 each extends radially through the inner ring 76 from a radial passage inlet 138 to a radial passage outlet 140. The radial passage inlet 138 is located at the inlet channel end 104, and is fluidly coupled with the inlet channel 94. Thus, the radial passage inlets 138 are axially aligned with the axial passage inlets 126. The radial passage outlet 140 is located at the ring outer side 90 and, for example, in the raceway surface 92.

One or more of the radial passages 102 each includes a slot 142 and an aperture 144 (e.g., a through hole). The slot 142 extends axially through the inner ring 76 from the radial passage inlet 138 and the inlet channel 94 to the intermediate channel 96. The slot 142 extends radially into the inner ring 76 from the ring inner side 88 to a slot side 146. The aperture 144 extends axially within the inner ring 76 between opposing sides 148. The aperture 144 extends radially through the inner ring 76 from the intermediate channel 96 to the radial passage outlet 140.

Referring to FIG. 2, the seal plate 62 extends axially between a seal plate first end 150 and a seal plate second end 152. The seal plate 62 extends radially between a seal plate inner side 154 and a seal plate outer side 156, where the inner side 154 defines a bore of the seal plate 62. The seal plate 62 extends circumferentially around the axis 22. The seal plate 62 includes a seal plate channel 158 and one or more seal plate passages 160. The seal plate channel 158 is configured as an annular notch. The seal plate channel 158 extends axially into the seal plate 62 from the first end 150, and radially into the seal plate 62 from the inner side 154. The seal plate passages 160 are fluidly coupled with the seal plate channel 158, and arranged circumferentially around the axis 22. One or more of the seal plate passages 160 each extends radially and axially through the seal plate 62 from the seal plate channel 158 to a passage outlet 162 at the outer side 156.

The spacer 60, the inner ring 76 and the seal plate 62 are mounted on the shaft 48, 50. The ring first end 84 axially engages the spacer end 68. The ring second end 86 axially engages the seal plate first end 150. The ring inner side 88 radially engages the shaft 48, 50. The inlet channel 94 is fluidly coupled with the spacer passages 70. The outlet channel 98 is fluidly coupled with the seal plate channel 158 and, thus, with the seal plate passages 160. The seal plate second end 152 axially engages the face seal 64. The outer ring 78 is attached (e.g., mechanically fastened, welded, brazed, adhered and/or otherwise bonded) to the stator 66. The outer ring 78, for example, may be fastened to the stator 66 via an interference fit and/or bolted to the stator 66. In another example, the outer ring 78 may be clamped between a shoulder of the stator 66 and a nut.

Figure 6:
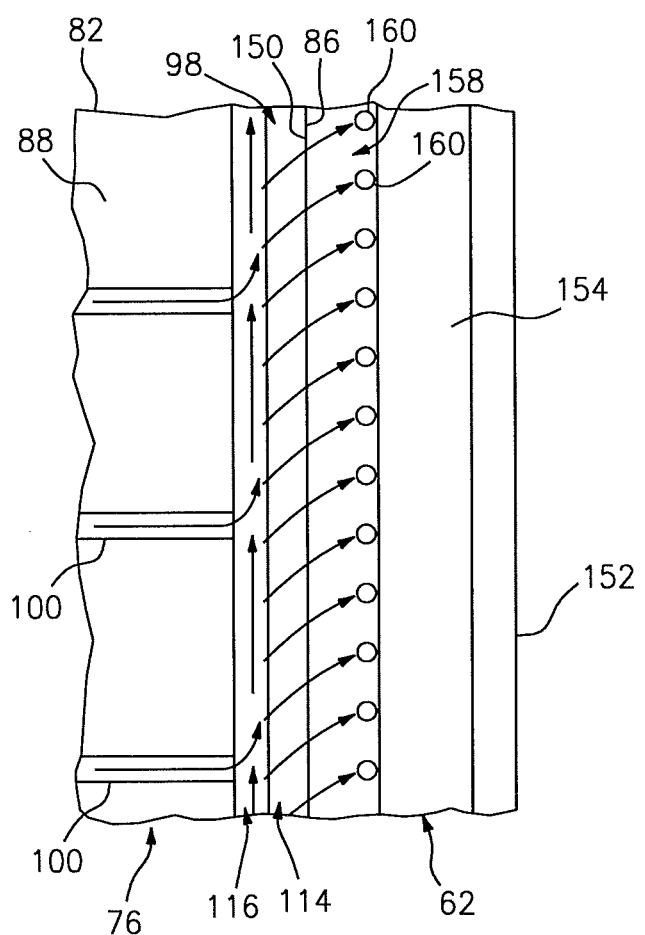
FIG. 6 is an illustration of a portion of an inner side of a bearing inner ring and a seal plate for the assembly of FIG. 2.
Figure 7:
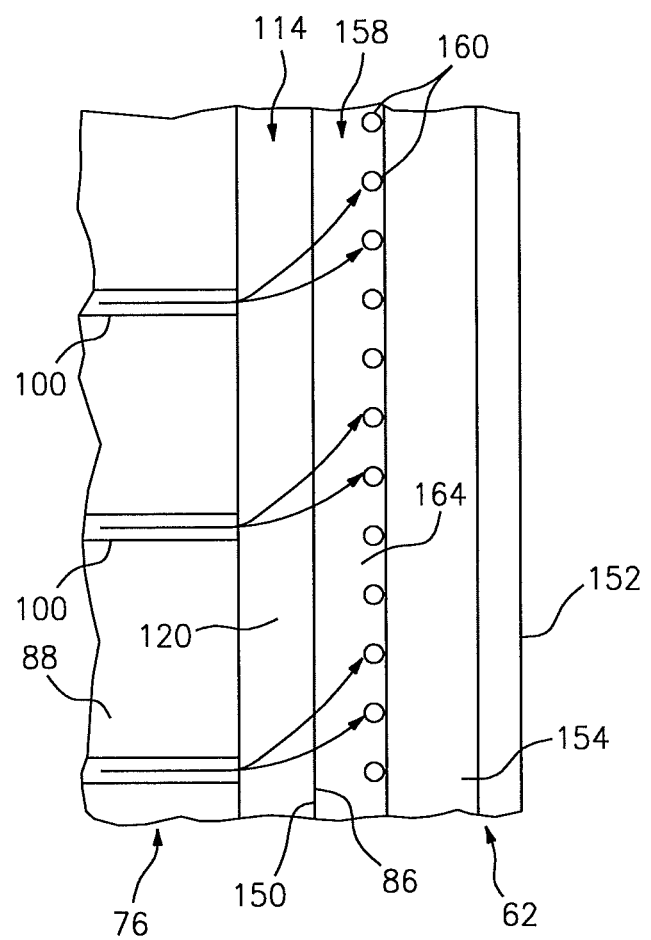
FIG. 7 is an illustration of a portion of an inner side of an alternate embodiment bearing inner ring and a seal plate.

During turbine engine 20 operation, the inlet channel 94 receives fluid (e.g., lubrication oil) from the spacer passages 70. Referring to FIGS. 2 and 5, the radial passages 102 may direct a portion of the received fluid to one or more of the rolling elements 74. Referring to FIG. 2, the axial passages 100 may direct another portion of the received fluid to the outlet channel 98. Referring to FIG. 6, the fluid within the outlet channel 98 may pool within the gutter 116 and thereby substantially uniformly distribute the fluid around the axis 22. The seal plate passages 160 therefore may receive substantially equal portions of the pooled fluid. In contrast, referring to FIG. 7, some of the seal plate passages 160 may receive more of the fluid than others in embodiments where the gutter 116 is omitted from the inner ring 76 and the flow passage side 120 is substantially radially level with a side 164 of the seal plate channel 158.

One or more components of the assembly 58 may have various configurations other than those described above and illustrated in the drawings. The spacer 60, for example, may alternatively be configured as a seal plate, a gear, a nut or any other type of turbine engine component that is mounted to a shaft of a turbine engine. The seal plate 62 may alternatively be configured as a spacer, a gear, a nut or any other type of turbine engine component that is mounted to a shaft of a turbine engine. The spacer 60 and/or the seal plate 62 may be omitted, and the inner ring 76 may be abutted against a shoulder of the shaft 48, 50. One or more of the components 60, 62 and/or 76 may be indirectly mounted onto the shaft 48, 50; e.g., mounted on another turbine engine component such as a sleeve. One or more of the channels 94 and/or 96 may be omitted; e.g., the axial passage inlets 126 and/or the radial passage inlets 138 may be located at the ring first side 84. One or more of the channels 94, 96 and 98 and/or one or more of the slots 130, 132 and/or 146 may be tapered towards the ring first end 84. The present invention therefore is not limited to any particular assembly 58 component types and/or configurations.

The assembly 58 may be included in various turbine engines other than the one described above as well as in other types of rotational equipment. The assembly, for example, may be included in a geared turbine engine where a gear train connects one or more shafts to one or more rotors in a fan section, a compressor section and/or any other engine section. Alternatively, the assembly may be included in a turbine engine configured without a gear train. The assembly may be included in a geared or non-geared turbine engine configured with a single spool, with two spools (e.g., see FIG. 1), or with more than two spools. The turbine engine may be configured as a turbofan engine, a turbojet engine, a propfan engine, or any other type of turbine engine. The present invention therefore is not limited to any particular types or configurations of turbine engines or rotational equipment.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A rolling element bearing, comprising:
a plurality of rolling elements arranged circumferentially around an axis, and radially between a bearing inner ring and a bearing outer ring;
the inner ring extending axially between a first end and a second end, and the inner ring including an annular first channel, an annular second channel and a plurality of passages;
the passages arranged circumferentially around the axis, a first of the passages comprising a slot that extends axially through the inner ring from the annular second channel to the annular first channel;
the annular first channel extending axially into the inner ring from the second end, and the annular first channel including a gutter that extends radially into and axially within the inner ring; and
the annular second channel extending axially within and radially into the inner ring.

2. The bearing of claim 1, wherein
the annular first channel further includes an annular notch that extends axially into the inner ring from the second end; and
the gutter comprises an annular groove that extends radially into the inner ring from the notch.

3. The bearing of claim 1, wherein each of the passages includes a passage inlet located at the first end, and extends axially through the inner ring from the passage inlet to the annular first channel.

4. The bearing of claim 1, wherein
the inner ring further includes an annular third channel that extends axially into the inner ring from the first end; and
the passages extend axially through the inner ring between the annular third channel and the annular first channel.

5. The bearing of claim 4, wherein the annular third channel comprises an annular notch.

6. The bearing of claim 1, wherein the slot extends radially into the inner ring from an inner side of the inner ring.

7. The bearing of claim 1, wherein
the passages comprises a plurality of first passages, and the inner ring further includes a plurality of second passages that are arranged circumferentially around the axis; and
the second passages extend radially through the inner ring to respective second passage outlets.

8. The bearing of claim 7, wherein one of the second passages includes an aperture that extends radially through the inner ring to a respective one of the second passage outlets.

9. The bearing of claim 7, wherein
one of the second passages includes a second slot that is fluidly coupled with an aperture;
the second slot extends radially into the inner ring from an inner side of the inner ring; and
the aperture extends radially through the inner ring to the respective second passage outlet.

10. The bearing of claim 9, wherein
the second slot extends axially through the inner ring to the annular second channel, and the aperture extends radially through the inner ring between the annular second channel and a respective one of the second passage outlets; and
the first of the first passages further includes a third slot that extends axially through the inner ring to the second channel.

11. The bearing of claim 1, wherein the inner ring comprises a split ring with a first axial ring segment and a second axial ring segment, and the annular second channel is formed at an interface between the first axial ring segment and second axial ring segment.

12. A rolling element bearing, comprising:
a plurality of rolling elements arranged circumferentially around an axis, and radially between a bearing inner ring and a bearing outer ring, wherein each of the rolling elements comprises a spherical ball bearing;
the inner ring extending axially between a first end and a second end, and including a plurality of first passages, a plurality of second passages and a channel;
the first passages for directing lubricant from respective first passage inlets to the channel;
the second passages for directing lubricant from respective second passage inlets to the rolling elements, wherein one of the second passage inlets is substantially axially aligned with one of the first passage inlets; and
the channel extending axially into the inner ring from the second end, and including a gutter that extends radially into and axially within the inner ring.

13. The bearing of claim 12, wherein
the channel further includes an annular notch that extends axially into the inner ring from the second end; and
the gutter comprises an annular groove that extends radially into the inner ring from the notch.

14. The bearing of claim 12, wherein
the inner ring further includes a second channel for directing lubricant into the first passage inlets and the second passage inlets; and
the second channel extends axially into the inner ring from the first end.

15. An assembly for a turbine engine, comprising:

a rolling element bearing and a turbine engine component arranged along an axis, the bearing including a bearing inner ring;

the inner ring extending axially between a first end and a second end, and the inner ring including a plurality of first passages, an annular first channel and an annular second channel;

the first passages arranged circumferentially around the axis, each of the first passages comprising a first slot that extends axially through the inner ring between the annular first channel and the annular second channel;

the annular first channel extending axially into the inner ring from the second end, and including a gutter that extends radially into and axially within the inner ring;

the annular second channel formed by and extending axially between axially opposed surfaces of the inner ring; and the turbine engine component including a plurality of component passages, wherein the channel is fluidly coupled between the first passages and the component passages.

16. The assembly of claim 15, wherein
the component passages are arranged circumferentially around the axis; and
each of the component passages extends radially through the turbine engine component to a component passage outlet.

17. The assembly of claim 15, wherein the turbine engine component further includes an annular notch that fluidly couples the annular first channel to the component passages.

18. The assembly of claim 15, wherein the turbine engine component comprises a seal plate.

19. The assembly of claim 15, wherein
the inner ring comprises a first axial ring segment and a second axial ring segment; and
the annular second channel is formed at an interface between the first axial ring segment and second axial ring segment.

20. The assembly of claim 15, wherein
the inner ring further includes an annular third channel that extends axially into the inner ring from the first end; and
each of the first passages further comprises a second slot that extends axially through the inner ring between the annular second channel and the annular first channel.

* * * * *